March 23, 1948. A. GABRIEL 2,438,317
SERVO ACTUATOR
Filed April 7, 1945 3 Sheets-Sheet 1

Adam Gabriel,
Inventor.
Haynes and Koenig
Attorneys.

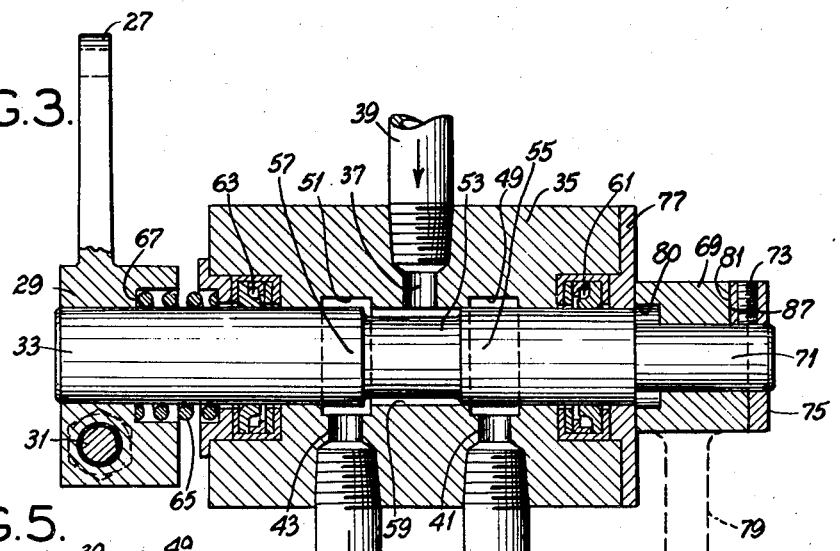
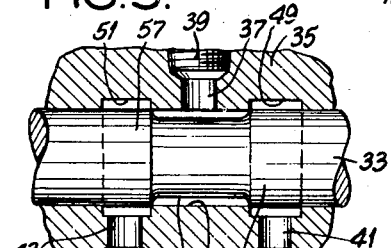
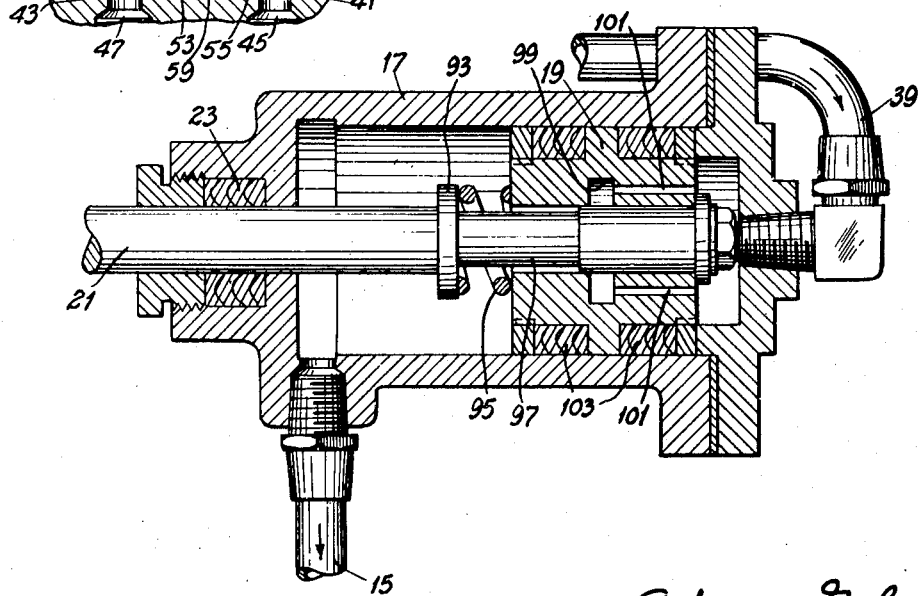

March 23, 1948.    A. GABRIEL    2,438,317
SERVO ACTUATOR
Filed April 7, 1945    3 Sheets-Sheet 3

Adam Gabriel,
Inventor.
Haynes and Koenig
Attorneys.

Patented Mar. 23, 1948

2,438,317

UNITED STATES PATENT OFFICE 2,438,317

SERVO ACTUATOR

Adam Gabriel, River Forest, Ill., assignor, by mesne assignments, to Acme Industrial Hydraulics, Inc., Chicago, Ill., a corporation of Illinois Application April 7, 1945, Serial No. 587,153

10 Claims. (Cl. 121—41)

This invention relates to fluid (particularly hydraulic) actuators, and with regard to certain more specific features, to servo actuators of this class for operating returnable mechanical systems such as hydraulic clutches, brakes and the like.

Among the several objects of the invention may be noted the provision of a hydraulic actuator incorporating a servo operation; the provision of apparatus of the class described which allows an operator to be completely in control at all times of the movement of a clutch or brake; the provision of a device of the class described which provides controlled movements throughout the entire power and return strokes of an operating piston, which movements are in proportion to the movement of a manual operating lever and wherein applied pressures are proportional to lever displacements from an initial position; the provision of apparatus of the class described incorporating improved means for making up leakage; and the provision of apparatus of this class which is simple to construct and maintain. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a top plan view of apparatus in its initial position and embodying the invention;

Fig. 3 is an enlarged vertical section taken on line 3—3 of Fig. 2 showing a release position of certain internal valve parts;

Fig. 5 is a fragmentary view similar to parts of Figs. 3 and 4 showing a neutral position of parts;

Fig. 6 is an enlarged vertical section taken on line 6—6 of Fig. 1;

Figure 1:
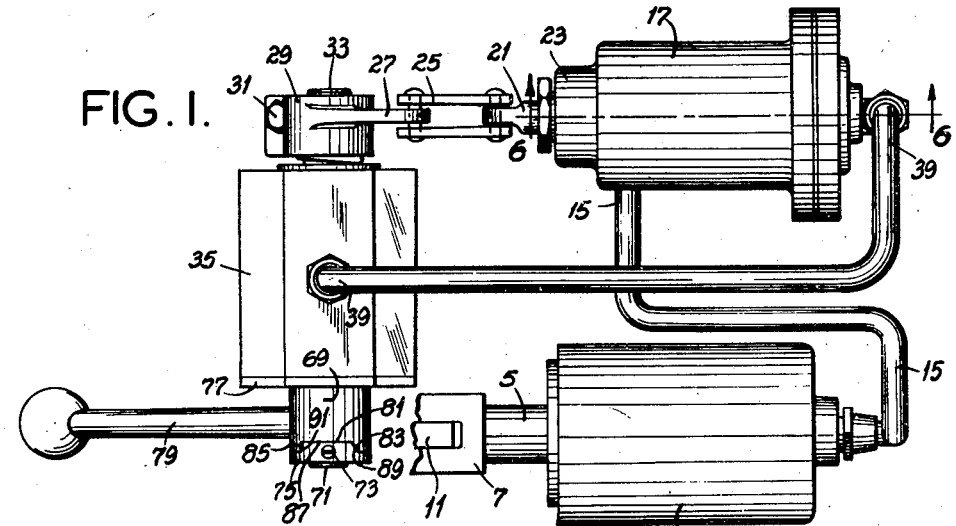

It is to be noted that Fig. 1 shows said cam mechanism closed.

Similar reference characters indicate corresponding parts throughout the several views of the drawings.

While the present invention is described in connection with apparatus for actuating clutches or brakes, it will be understood that other similar apparatus may likewise be operated.

Figure 2:
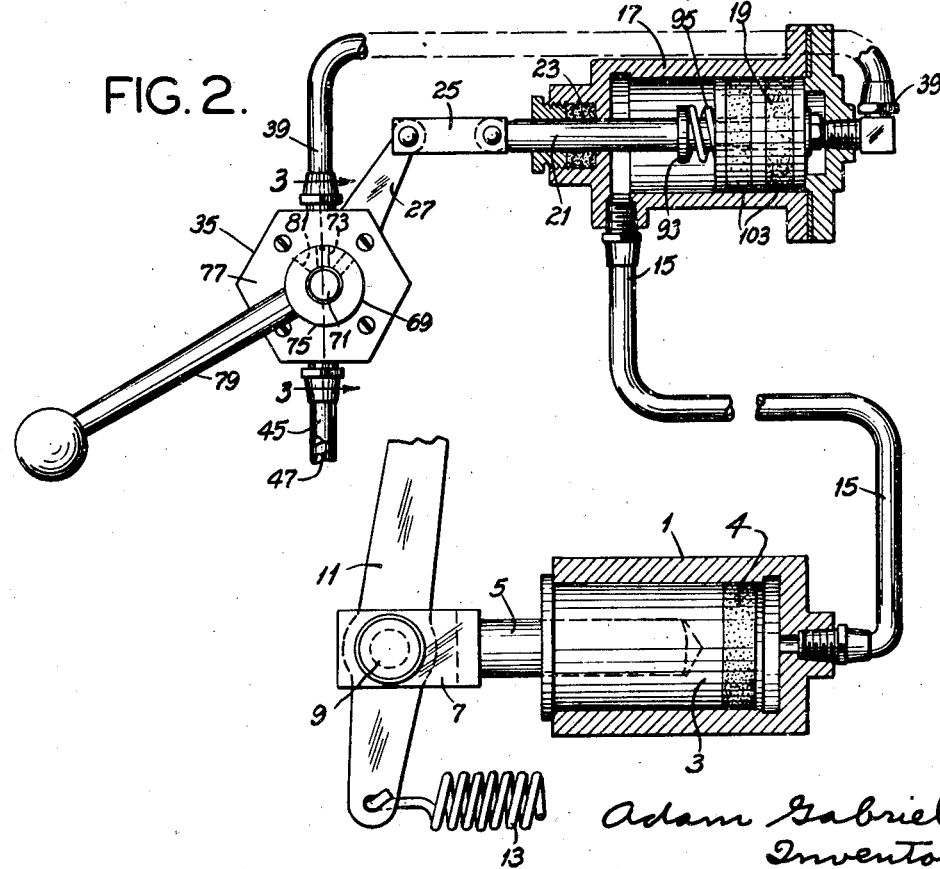
Fig. 2 is a front elevation of Fig. 1, parts being broken away to show certain details.

Referring now more particularly to Figs. 1 and 2, there is shown at numeral 1 an operating cylinder in which is a power operating piston 3 (Fig. 2) from which extends a piston rod 5. The piston 3 is packed at 4. The rod 5 carries a clevis 7 pivoted at 9 to a lever 11. This lever 11 constitutes part of the usual operating mechanism of the clutch or brake, as the case may be. In the case of a brake, this lever is connected to operate against the resistance set up in applying the brake; and in the case of a clutch, against the usual spring resistance which is set up in opening a clutch. An additional return spring 13 is attached to the lever 11 as shown for aiding the opening action of a brake, or the closing action of a clutch in biasing the piston 3 toward the head end of its hydraulic cylinder 1. Under pressure in the cylinder 1 the piston 3 moves toward the left (Fig. 2). Upon release of pressure it moves to the right.

The head of the cylinder 1 has connected thereto a hydraulic pressure line 15, which communicates with one (the left) end of a servo control cylinder 17. This connection is beneath a control piston 19 therein (Fig. 2). A piston rod 21 from piston 19 extends through a packing gland 23 in the cylinder 17. This rod 21, by means of a connecting link 25, is articulated with a servo control lever 27. Lever 27 has a split hub 29 which is clamped to a valve stem 33 as indicated at 31. This valve stem has both rotary and axial movement in a valve housing 35 (compare Figs. 3, 4 and 5 for various axial positions). The stem has a lap or other good sealing fit in the housing 35. The links 21, 25 and 27 have enough lateral play at their joints to allow for lateral movement of stem 33.

Figure 7:
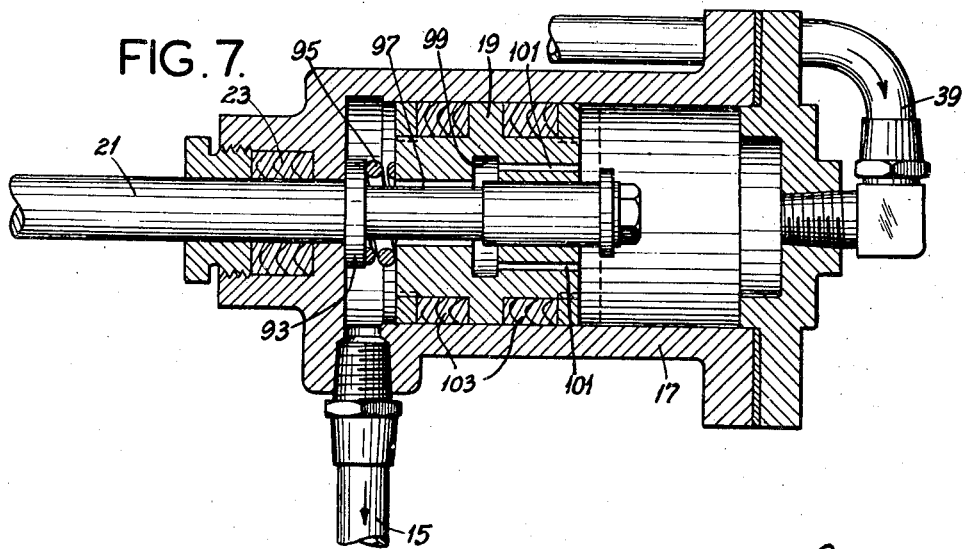
Fig. 7 is a view similar to Fig. 6 but showing alternative positions of the relevant parts.

The housing 35 has a port 37 connected through a transfer pipe 39 with the head end of the cylinder 17 (Figs. 1, 2 and 7). The housing 35 also includes ports 41 and 43 with which are attached suitable hydraulic lines 45 and 47 respectively. Line 45 is a hydraulic pressure inlet line, being supplied with pressure by a suitable pump, pressure system or the like. Line 47 is an exhaust or relief line and passes to a suitable sump which supplies the pump or pressure system. Neither the sump, pump or other auxiliaries are shown since they form no part of the invention, being known.

Adjacent to the ports 41 and 43, body 35 is formed with grooves 49 and 51, respectively. Beyond and between the grooves 49 and 51 the valve stem 33 has the stated close sealing fit with respect to the body 35.

Figure 4:
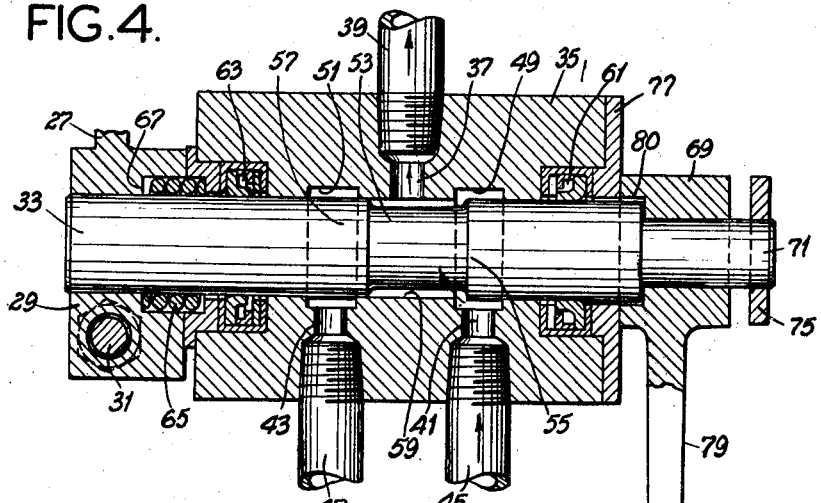
Fig. 4 is a view similar to Fig. 3, showing a pressure-applying position of parts.

The stem 33 is centrally grooved as shown at 53, providing adjacent thereto what may be termed lands 55 and 57. These lands cooperate with the cylindric portion 59 between grooves 49 and 51 to provide valve action if and when the stem 33 is moved back and forth axially. For example, in Fig. 3 the stem is to the left, which cuts off the pressure pipe 45 from the transfer pipe 39, while exhausting the latter to the relief pipe 47. In Fig. 4 the pressure pipe 45 is in communication with the transfer pipe 39, whereas the relief pipe 47 has been cut off. In Fig. 5 the stem is in a neutral position wherein both pipes 45 and 47 are cut off from the transfer pipe 39. Endwise packing glands 61 and 63 prevent leakage from between members 33 and 35.

A spring 65 reacts from the outer element of the packing 63 and against the bottom of a recess 67 in the hub 29. Hence the stem 33 is normally biased toward the left, as shown in Fig. 3. The stem 33 is prevented from moving further to the left by reason of the structure to be described at the other end of the valve stem 33.

Figure 8:
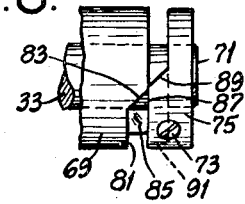
Fig. 8 is a detail plan view of a cam mechanism shown open.

An extension 71 of the stem 33 has a cam disc 75 fastened to it by means of a set screw 73. Between the disc 75 and a gland-enclosing plate 77 on the body 35 is a hub 69 of an operating lever 79. Lever 79 might also be a foot pedal or the like, instead of the hand lever shown. In either case it may be called manually operative means. This lever is capable of relative rotary movement with respect to the extension 71. It includes a counterbore or recess 80 into which the stem 33 may move axially when the latter is moved to the right (compare Figs. 3 and 4). The hub 69 of the lever 79 is formed with a notch 81 (Fig. 1) one side of which forms a sloping cam 83 and the other side of which forms a right-angular step 85. The cam disc has a cooperating cam lobe 87, one side of which is sloping to form a cam as shown at 89, and the other side of which constitutes a right-angular step as shown at 91. In the position shown in Fig. 1, the steps 85 and 91, and the slopes 83 and 89, are in contact, that is, the lobe 87 fits in the notch 81. When the lever 79 is depressed (Fig. 1), that is, rotated counterclockwise (Fig. 2), the cam 83 on the hub 69 pushes out the cam 89 on the cam lobe 87, as indicated in Fig. 8. This forces the valve stem 33 to the right, as indicated in Fig. 4, which is against the biasing action of the return spring 65 (Fig. 4). When the lever 79 is returned, the stem 33 may return under action of spring 65.

Referring now more particularly to Figs. 6 and 7, the piston 19 is slidable on the piston rod 21. The piston 19 is packed with respect to the inner surface of the cylinder 17 by packing 103. The rod 21 carries a shoulder 93 upon which seats a fairly stiff spring 95. The spring reacts against the piston 19 and normally holds it in the Fig. 6 position, even against normal liquid pressure on piston 19. Between the shoulder 93 and the head end of the piston rod 21 is a peripheral recess 97. Within the piston 19 is a groove 99 which is always in communication with the head end of the piston by means of ports 101. When the parts are in the normal positions shown in Fig. 6, there is no liquid communication from one side of the piston to the other, but when they are in the position shown in Fig. 7 fluid may flow from the right-hand side of the piston to the left-hand side. At this time the spring is compressed under conditions which will be specified below in the description of the operation.

Operation is as follows:

Assume that a suitable hydraulic fluid fills the space to the left of the piston 19 and to the right of piston 3, including the pipe 15 (Fig. 2). Assume also that hydraulic fluid under pressure is carried in the inlet supply pipe 45; also, that the transfer pipe 39 and connected passages are filled. The fluid may be of the usual type for the purpose, such as hydraulic brake fluid.

Figure 9:
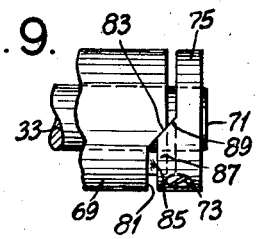
Fig. 9 is a view similar to Fig. 8 showing said mechanism partially closed.

Starting with the conditions as shown in Figs. 1, 2, 3 and 6, the hand lever 79 may be pushed down, that is to say, turned counterclockwise in Fig. 2. This rotates the lever hub 69 from the Fig. 1 position, through a position as shown in Fig. 9, to a position such as shown in Fig. 8. This forces the disc 75 to the right and draws the valve stem 33 from the Fig. 3 position, through the Fig. 5 position, and to the Fig. 4 position. Thus the fluid under pressure is admitted from the pressure pipe 45 to the transfer pipe 39, which leads to cylinder 17 and pushes the piston 19 to the left. This forces liquid from the left side of the piston 19 through the pipe 15 to the cylinder 1, which drives the piston 3. The result is that the lever 11 is moved against the action of the spring 13 and whatever forces are involved in setting a brake or opening a clutch or the like.

At this time the servo piston rod 21 is also forced to the left, by reason of pressure on its piston 19, spring 95 being stiff enough to avoid deflection under these conditions. Hence stem 33 is rotated so that after a short interval angular movement of the disc 75 follows that of the hub 69. Whenever the manual operation on the lever 79 ceases, the applied pressure on the piston 19 momentarily continues to cause its advance and hence momentary further advance of the piston rod 21. Thus momentarily the valve stem 33 rotates further, with the result that the cam angularly overtakes the hub 69 so that as these parts move from the position shown in Fig. 8 to the mid-position shown in Fig. 9. As the sloping cam 89 slides down the cam 83 of the hub 69, the stem 35 moves to its neutral position shown in Fig. 5. When the cam 89 is about halfway down the cam 83, and the neutral position of the valve stem 33 is reached, the pressure pipe 45 is cut off from the transfer pipe 39. Hence pressure ceases to force the piston 19 any further. The pistons 19 and 3 then remain in whatever displaced positions they have assumed and the system connected to lever 11 is held in an intermediate position under balanced forces.

If the lever 79 is further advanced counterclockwise, the above-described operation is repeated with further advance of the pistons 19 and 3 and further advance of the lever 11. This increases the brake-setting or clutch-opening pressure, as the case may be. Thus additional displacement may be accomplished on lever 11 with whatever additional pressure is necessary to hold a balanced setting, with the ability to stop the lever at any point under said balanced pressure. This is ideal for clutch and brake operations.

At any time that it is desired to retract the lever 11, the handle 79 is rotated in return direction (up in Fig. 1; clockwise in Fig. 2). The result is that the hub 69 is moved in such a direction that the cam 89 of the disc 75 rides down cam 83 until the vertical faces 85 and 91 engage. This sends the stem 33 into the Fig. 3 axial (release) position so long as the lever 79 is being moved toward its initial position. The result is that the pipe 39 is connected to the relief pipe 47. Under return action of the spring 13 and the reactive forces of the clutch or brake mechanism, all applied to the lever 11, the piston 3 returns, forcing the liquid out over the line 15 and under the piston 19. This returns the piston 19 toward its Fig. 6 position. It is under the return action of this piston 19 that the liquid is pushed out from line 39 to the release pipe 47. During return action of the lever 79 it may at any instant be stopped, whereupon the cam 89 will overrun cam 83 in the reverse direction (clockwise in Fig. 2) and cause a resetting of the parts to the neutral position shown in Figs. 9 and 5. Thus both the relief port and pressure port 45 are cut off and the pistons 19 and 3 stop under reduced balanced pressures on their respective opposite sides.

In Fig. 7 is shown the limiting position on the power stroke of the piston 19 wherein the collar 93 of the piston rod 21 has contacted the end of the cylinder 17. This means that the cam 75 is no longer rotary to overtake the hub 69 and the valve remains in the Fig. 4 axial position wherein pressure flows in from pipe 45 to transfer pipe 39 and is applied against the piston 19. This causes piston 19 to compress the spring 95. When this spring is sufficiently compressed, the connection between the recesses 99 and 97 is opened, thereby permitting fluid to pass through the piston 19 to make up any leakage which may have occurred in the connections beyond cylinder 17, and also makes up leakage that may have occurred from the packing 23. Hence it will be seen that simply by moving the lever 79 to its extreme counterclockwise position (as viewed in Fig. 2), hydraulic fluid may be introduced into the pressure line between cylinders 17 and 3 for fluid make-up purposes.

It will be seen that the device constitutes a fluid (hydraulic) servo actuator for producing variable volume as well as variable pressure in the line 15 and any device connected with it. Such a device might also be a device other than a clutch or brake. In face these are only examples of returnable mechanical systems having return biases, and for which the invention is particularly adapted.

It is to be understood that within the invention mechanical equivalents may be used for the pistons 19 and 3 in their cylinders, such as for example diaphragms, flexible bellows and the like. A generic term for such means and used in the following claims is expansible chamber means.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A hydraulic actuator for a fluid-pressure-operated device, comprising a control cylinder, a control piston movable in said cylinder, said control cylinder having a port on one side of said control piston adapted to be connected to said fluid-pressure-operated device, a valve having pressure and relief ports, a transfer connection from a point in the control cylinder on the other side of said control piston and extending to said valve, a control member in the valve adapted in a neutral position to cut off both of said pressure and relief ports from said transfer connection, or to cause selective communication therewith from either the pressure port or the relief port, means including a manually operable member rotary on the control member for moving the control member, a servo connection between said control piston and the control member whereby, after a movement of the control member by the manually operable member to a position to communicate the pressure port with the transfer connection, the control member is caused to reset itself into neutral position, means blocking the movement of the servo connection after predetermined movement thereof, and fluid control means between said piston and its servo connection with the control member adapted to admit make-up fluid through the piston to the port in the cylinder when said movement of the servo connection is blocked.

2. Apparatus of the class described for operating fluid-operated brakes, clutches and the like, comprising a control cylinder, a control piston therein, said cylinder being adapted to supply fluid to a brake, clutch or the like, a piston rod extending out of said control cylinder from said control piston, a valve having a rotary and axially movable stem, said valve having a fluid transfer connection with said control cylinder and having a pressure inlet port and a relief port, said stem being axially movable from a neutral position in which the pressure inlet and the relief port are disconnected from said transfer connection to alternate axial positions for selectively connecting said pressure port or said relief port to said transfer connection, a linkage connecting said piston rod with the stem for rotating the latter, a control element rotary on the stem, cam means associated with the stem and control element for moving the stem axially to admit pressure to said control cylinder upon rotation of the control element relative to the stem, said control piston in response to said pressure being adapted through said linkage to rotate said stem to cause the cam means to return the stem to neutral position.

3. Apparatus of the class described for operating fluid-operated brakes, clutches and the like, comprising a control cylinder, a control piston therein, said cylinder being adapted to supply fluid to a brake, clutch or the like, a piston rod extending out of said control cylinder from said control piston, a valve having a rotary and axially movable stem, said valve having a fluid transfer connection with said control cylinder and having a pressure inlet port and a relief port, said stem being axially movable from a neutral position in which the pressure inlet and the relief port are disconnected from said transfer connection to alternate axial positions for selectively connecting said pressure port or said relief port to said transfer connection, a linkage connecting said piston rod with the stem for rotating the latter, a control element rotary on the stem, cam means associated with the stem and control element for moving the stem axially to admit pressure to said control cylinder upon rotation of the control element relative to the stem, said control piston in response to said pressure being adapted through said linkage to rotate said stem to cause the cam means to return the stem to neutral position, a stop for the linkage limiting its return movement, said control piston being slidable on said piston rod, port means controlled by the position of said piston on the rod, means normally biasing the control piston against fluid pressure to close said port means but responding to increased pressure on the control piston when said stop becomes operative to allow movement of the piston on its stem and opening of said port means.

4. Apparatus of the class described for operating brakes, clutches and the like, a control cylinder, a control piston in said control cylinder, a piston rod extending out of said control cylinder from said control piston, a valve having a rotary and axially movable valve stem, said valve having a transfer connection with said control cylinder and having a pressure inlet and a relief outlet, said stem being axially movable from a neutral position in which the pressure inlet and the relief outlet are disconnected from said transfer connection to alternate positions for selectively connecting said pressure inlet or said relief outlet to said transfer connection, a linkage connecting said piston rod with the stem for rotating the latter, a lever rotary on the stem, cooperable cam means on said stem and lever for moving the stem axially to admit pressure to said control cylinder upon rotation of the lever relative to the stem in one direction, said control piston in response to said pressure being adapted when the lever stops to rotate said stem relative to the lever to cause the cam means to return the stem to neutral position, said cam means being adapted in response to reverse movement of the lever to move the stem to a position to communicate said transfer connection to the relief outlet and through said linkage to aid in returning said control piston to an initial position.

5. In apparatus of the class described, a valve having a pressure inlet port and a relief port, a hydraulic servo mechanism connected with said valve through a third transfer port of the valve, a rotary and axially movable valve stem in said valve adapted to assume a neutral axial position in which all ports are out of communication with one another and adapted to assume displaced axial positions from neutral selectively to connect the inlet or the relief port with said transfer port, a connection between said servo mechanism and the valve stem for rotating it, means biasing the stem axially towards its position connecting the relief port with the transfer port, control means rotary on the valve stem, cooperating cam means between the control means and said stem for moving said stem against its bias towards a position for connecting said inlet port with the transfer port upon rotation of said control means relative to the stem.

6. In apparatus of the class described, a valve having a pressure inlet port and a relief port, a hydraulic servo mechanism fluid connected with said valve through a transfer port, a rotary and axially movable valve stem in said valve adapted to assume a neutral axial position in which all ports are out of communication with one another and adapted to assume moved axial positions displaced from neutral selectively to connect the inlet and the relief ports with said transfer port, a mechanical connection between said servo mechanism and the valve stem for rotating it, means biasing the stem axially towards connecting the relief port with the transfer port, manual control means rotary on the valve stem, cooperating cam means between the manual control means and said stem for moving said stem against its bias toward a position for connecting said pressure port with the transfer port upon rotation of said control means relative to the stem in one direction, said cooperating cam means being arranged to permit the biasing means to move the valve stem toward the position for connecting the relief port with the transfer port upon rotation of the control means in the reverse direction.

7. In apparatus of the class described, a valve having a pressure inlet port and a relief port, a hydraulic servo mechanism connected with said valve through a transfer port, a rotary and axially movable valve stem in said valve adapted to assume a neutral axial position in which all ports are out of communication with one another and adapted to assume moved axial positions from neutral selectively to connect the inlet or the relief port with said transfer port, a mechanical connection between said servo mechanism and the valve stem for rotating it, means biasing the stem axially towards connecting the relief port with the transfer port, manual control means rotary on the valve stem, cooperating cam means between the manual control means and said stem for moving said stem against its bias toward a position for connecting said inlet port with the transfer port upon rotation of said control means relative to the stem in one direction, said cooperating cam means being arranged to permit the biasing means to move the valve stem toward the position for connecting the relief port with the transfer port upon rotation of the control means in the reverse direction, a movable piston rod in said servo mechanism, movement limiting means thereon, a movable ported piston thereon, the ports of the piston closing in a first position of the piston on the rod and opening in a second position, spring means biasing the piston to said first position, fluid pressure on the piston from the transfer port being adapted to move the piston toward said second position but only after compressing the spring means after said movement limiting means has been brought into action, the spring means being strong enough that otherwise the piston under fluid pressure thereon moves the rod by way of said piston biasing means.

8. In apparatus of the class described, a valve having a pressure inlet port and a relief port, a hydraulic servo mechanism connected with said valve through a transfer port, a rotary and axially movable valve stem in said valve adapted to assume a neutral axial position in which all ports are out of communication with one another and adapted to assume alternate moved axial positions from neutral selectively to connect the inlet or the relief port with said transfer port, a servo connection between said servo mechanism and the valve stem for rotating it, means biasing the stem axially towards connecting the relief port with the transfer port, manual control means rotary on the valve stem, cooperating cam means between the manual control means and said stem providing for axial movement of said stem against its bias toward a position for connecting said inlet port with the transfer port when the manual control means is rotated in one direction, and servo movement limiting means in said servo mechanism.

9. In apparatus of the class described, a valve having a pressure inlet port and a relief port, a hydraulic servo mechanism connected with said valve through a transfer port, a rotary and axially movable valve stem in said valve adapted to assume a neutral axial position in which all ports are out of communication with one another and adapted to assume alternate moved axial positions from neutral selectively to connect the inlet or the relief port with said transfer port, a servo connection between said servo mechanism and the valve stem for rotating it, means biasing the stem axially towards connecting the relief port with the transfer port, manual control means rotary on the valve stem, cooperating cam means between the manual control means and said stem providing for axial movement of said stem against its bias toward a position for connecting said inlet port with the transfer port when the manual control means is rotated in one direction, said servo mechanism comprising a cylinder, a piston rod therein forming part of the connection to said valve stem, a piston sliding on said rod, said piston and said rod being ported so that in one position of the piston there is a communication between its opposite sides and in its other position said communication is blocked, means biasing the piston toward its blocked position, and stop means between the piston rod and the cylinder for limiting movement of the rod, said piston being automatically moved against said bias under pressure when the rod stops whereby communication is effected between its opposite sides.

10. In combination with a fluid pressure actuated servo device, a fluid circuit including a valve for controlling the supply of fluid to said device, said valve comprising a valve housing having a valve member mounted for axial and rotary movement therein, said valve member being movable axially from an initial position to an operative position for supplying fluid to the servo device, a control element rotary on the valve member, means including cooperating camming elements upon the control element and valve member for moving the latter axially from its initial position to its operative position upon rotation of the control element relatively to the valve member, and a mechanical connection between the servo device and the valve member for rotating the latter relatively to the control element upon operation of the servo device following actuation of the control element to return the valve member to its initial position through said means.

ADAM GABRIEL.

REFERENCES CITED

The following references are of record in the file of this patent:

UNITED STATES PATENTS

| Number | Name | Date |
| --- | --- | --- |
| 949,559 | Wilson | Feb. 15, 1910 |
| 1,604,545 | Bragg | Oct. 26, 1926 |
| 1,657,412 | Schneider | Jan. 24, 1928 |
| 2,105,473 | Dean | Jan. 18, 1938 |
| 2,159,142 | Fischer | May 23, 1939 |
| 2,261,444 | Neubert | Nov. 4, 1941 |
| 2,316,320 | Dewandre | Apr. 13, 1943 |
| 2,370,137 | Biggert | Feb. 27, 1945 |